Sept. 17, 1935.  T. R. LAING  2,014,437
CAMERA
Filed June 7, 1934  4 Sheets-Sheet 1
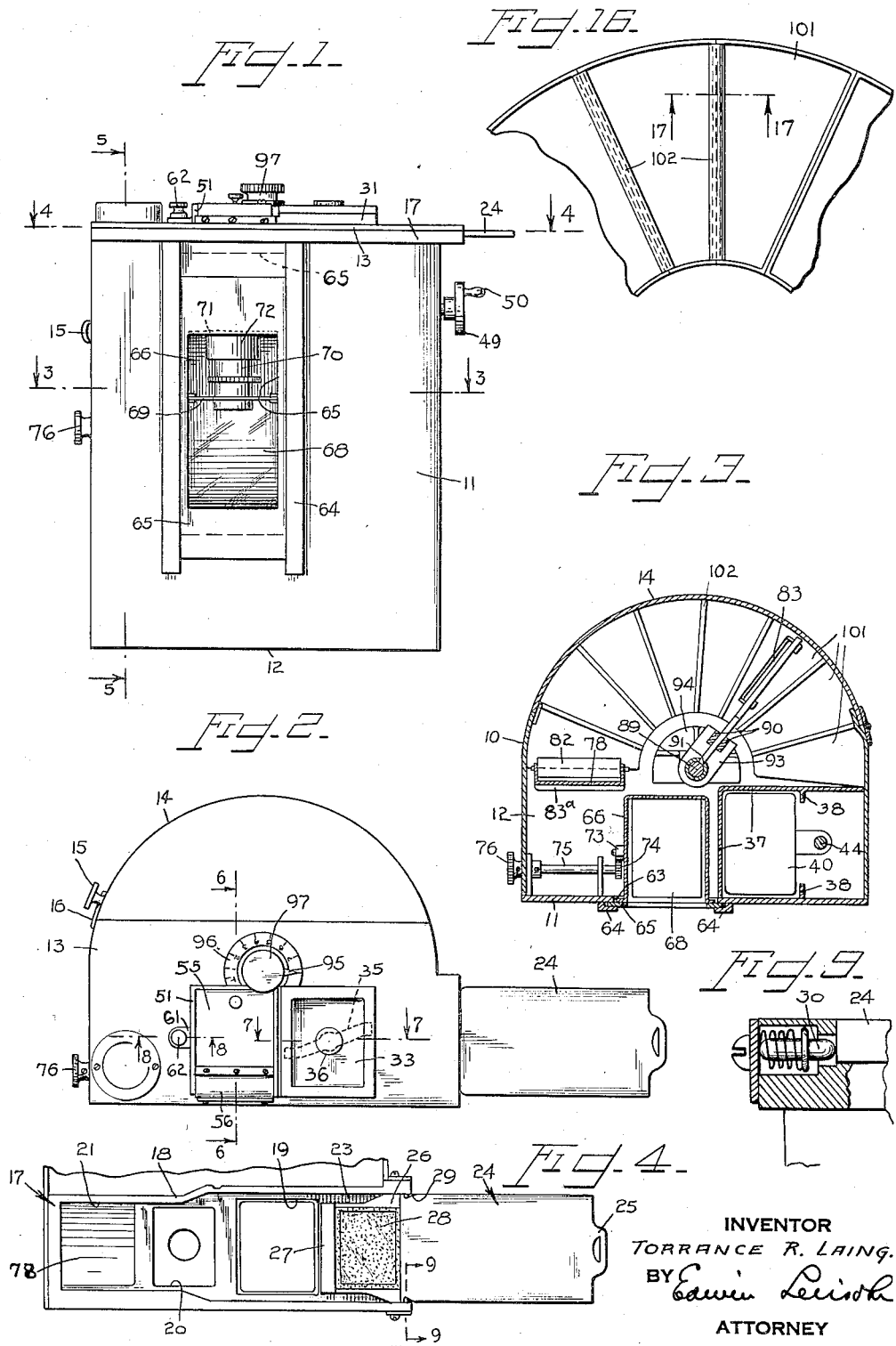
INVENTOR
TORRANCE R. LAING.
BY
ATTORNEY Sept. 17, 1935.                T. R. LAING                  2,014,437
                                CAMERA
                          Filed June 7, 1934        4 Sheets-Sheet 2
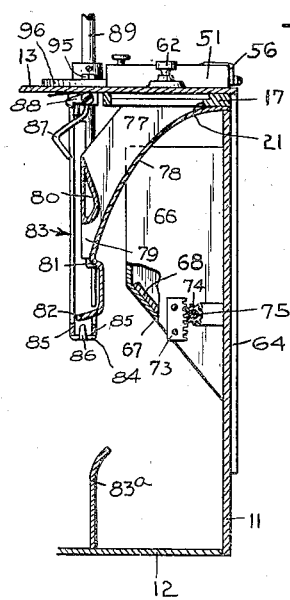
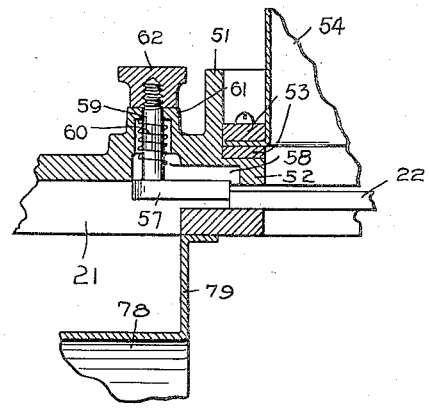
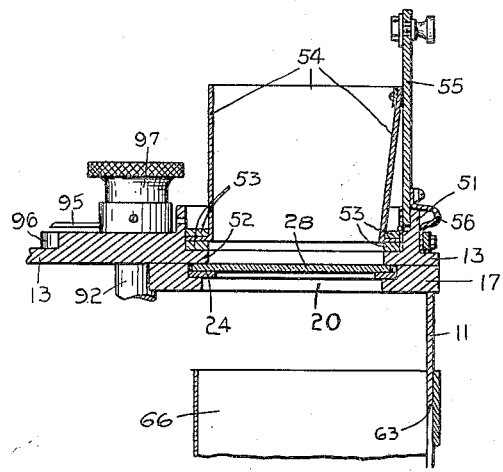
INVENTOR
TORRANCE R. LAING.
BY *Edwin Leusohr*
ATTORNEY Sept. 17, 1935. T. R. LAING 2,014,437
CAMERA
Filed June 7, 1934 4 Sheets-Sheet 3
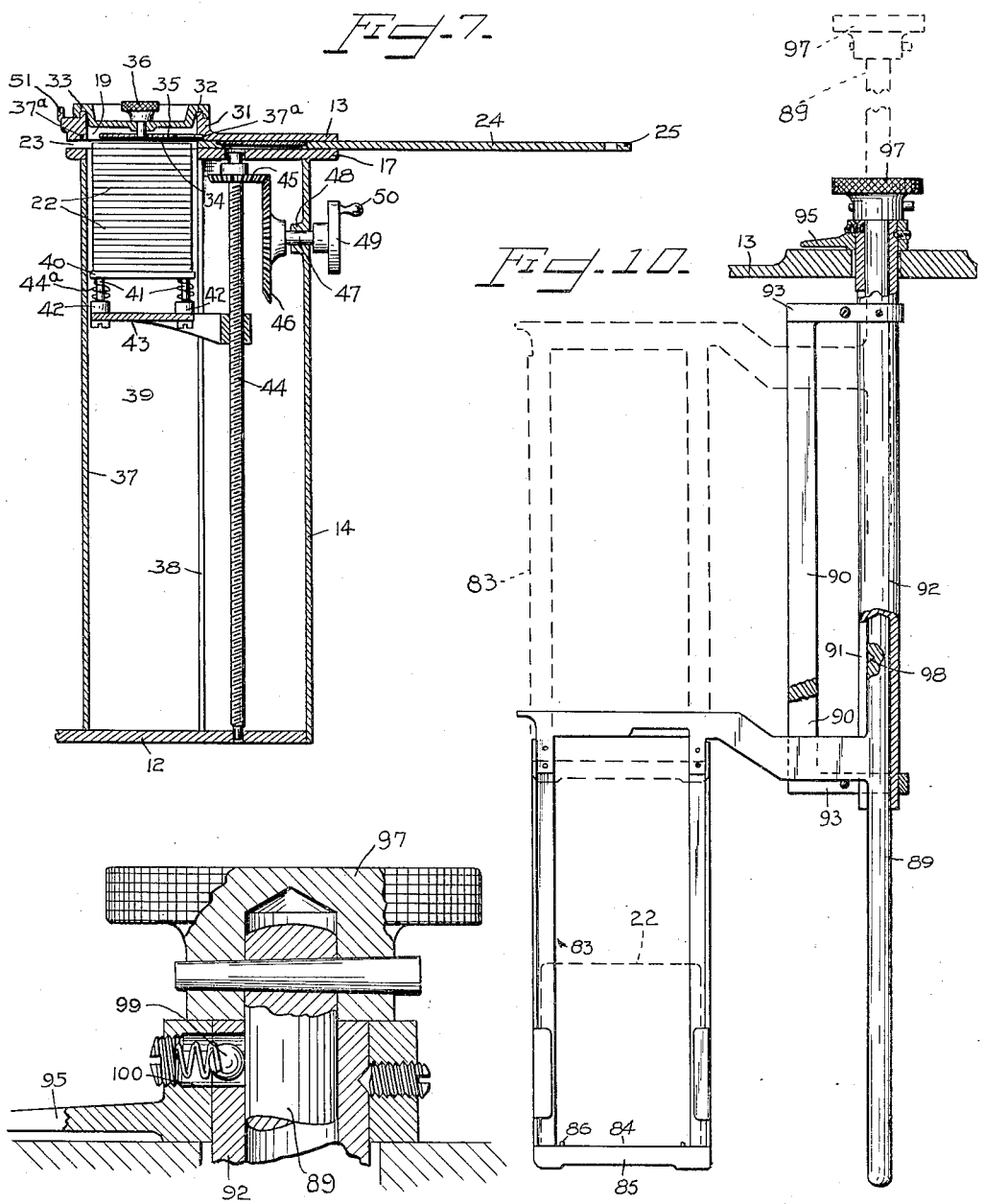
INVENTOR
TORRANCE R. LAING.
BY
ATTORNEY Sept. 17, 1935. T. R. LAING 2,014,437
CAMERA
Filed June 7, 1934 4 Sheets-Sheet 4
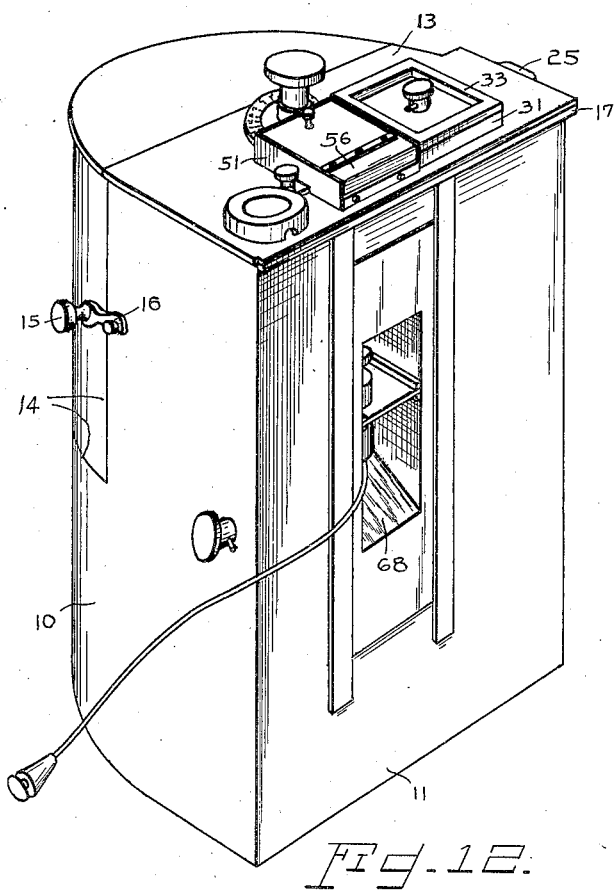
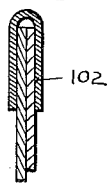
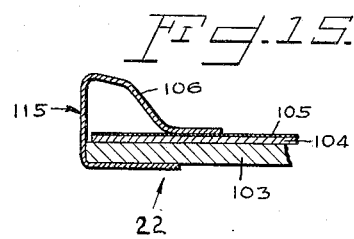
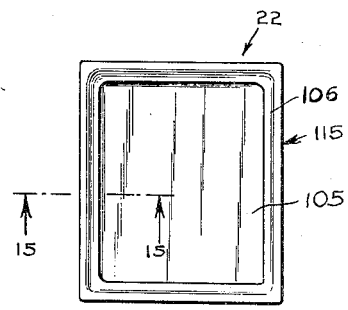
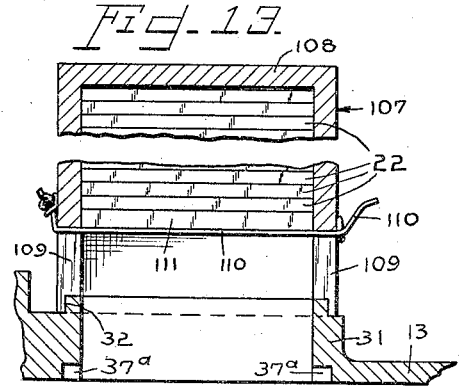
INVENTOR
TORRANCE R. LAING.
BY
ATTORNEY Patented Sept. 17, 1935

2,014,437

UNITED STATES PATENT OFFICE 2,014,437

CAMERA

Torrance R. Laing, New York, N. Y., assignor to William Rabkin, New York, N. Y.

Application June 7, 1934, Serial No. 729,406

32 Claims. (Cl. 95—13)

This invention relates to portable photographic apparatus and has reference particularly to improvements in cameras of the so called magazine developing type.

Portable magazine developing cameras are known and they are equipped to take and develop pictures directly on sensitized cards, tintypes and the like without necessitating their removal from the camera from the time the sensitized cards or tintypes are placed in the magazine to the time each one is discharged therefrom as a finished picture.

The present invention has for its object to provide a combined magazine camera and developing unit, which embodies in its construction certain improvements making the handling of the sensitized plates, cards, or tintypes very much easier than has heretofore been possible and to facilitate the development of the exposed plates, cards, or tintypes to the point where the finished picture may be produced within the period of approximately two or three minutes.

Another object of the invention is to provide a readily portable casing which embodies within its walls all of the elements necessary for the carrying of a plurality of light sensitive members, for the positioning of each successive member in position for exposure to the light rays from the scene and thereafter to progressively move that light sensitive member through a process of developing steps which finally delivers it as a finished photograph without the necessity of touching the member with the hand of the operator and without bringing it outside the casing until it is entirely finished.

A further object of my invention is to provide a novel developing unit, whereby the light sensitive member or members after exposure may be carried through a series of developing, washing, and fixing baths with the greatest facility and in the minimum of time.

A still further object of the invention is to afford an especially designed container or pack for a plurality of the light sensitive members, which container is capable of being associated with the magazine of the camera, whereby the latter may be loaded in daylight without fear of light striking their sensitive surfaces during the transfer.

I accomplish the objects of my invention by means of an apparatus, one embodiment of which is described in the specification, set forth in the appended claims and illustratively exemplified in the acompanying drawings, in which Figure 1 is a front elevational view of my camera and developing device;

Figure 2 is a top plan view of the same;

Figure 3 is a substantially transverse sectional view of the developing unit taken on the lines 3—3 of Figure 1;

Figure 4 is a plan view of the casing magazine, etc. with the cover plate removed and as viewed from the lines 4—4 of Figure 1;

Figure 5 is a substantially vertical sectional view, taken on lines 5—5 of Figure 1, of the guide chamber and swinging developing frame, the latter being in position to receive the sensitized member after exposure;

Figure 6 is a substantially vertical sectional view, taken on lines 6—6 of Figure 2, through the finder showing the hood or shadow box open;

Figure 7 is a substantially vertical sectional view, taken on lines 7—7 of Figure 2, and showing the magazine containing a plurality of sensitized members or plates;

Figure 8 is a substantially sectional view, taken on lines 8—8 of Figure 2, to show the stop for the sensitized member to hold it in position during exposure;

Figure 9 is an enlarged sectional view taken on lines 9—9 of Figure 4;

Figure 10 is a substantially elevational view of the swinging developing frame, parts being broken away;

Figure 11 is an enlarged detailed sectional view of releasable stop for holding the developing frame in receiving position;

Figure 12 is a perspective view of the entire camera;

Figure 13 is a sectional view of the intake opening into the magazine of the camera and the container discharging its contents of sensitized members into the magazine;

Figure 14 is a front elevational view of a light sensitive member used in this camera and carried in the container;

Figure 15 is a substantially transverse, enlarged section of the member taken on lines 15—15 of Figure 14;

Figure 16 is a plan of a plurality of tanks showing the means for holding them together and for preventing drainage between adjacent sides; and Figure 17 is a substantially sectional view taken on lines 17—17 of Figure 16.

Referring to the drawings, 10 denotes a semi-cylindrical metal housing having the curved wall for the back and a straight flat wall 11 for the front. The bottom is closed by a plate 12 and top by a cover plate 13. The rear wall and cover plate is separated at the upper half to form a door 14 which is hinged to the side of the housing and which when opened gives access to the interior of the camera. The door 14 is provided with a knob 15 and hook 16 to fasten it in its closed position.

Mounted laterally in the upper end of the housing 10 is a rectangular guide plate 17 having its one side coinciding with the straight front wall 11 and being disposed directly beneath the front portion of the cover plate 13. The guide plate 17 is provided with marginal upright flanges or guides 18 along its front and rear sides and the flat mid-portion, from right to left, is apertured as follows: a rectangular magazine opening 19, a central exposure opening 20 and a discharge opening 21, the central opening being slightly smaller than the magazine and discharge openings because the light sensitized members 22 must pass through them, while the central opening 20 merely frames and supports the members 22 during exposure. The guides 18 as they approach the central opening 20 are inclined inwardly towards each other so that at a point substantially in the center of the opening 20 they are spaced apart practically the length of the light sensitive members, as illustrated particularly in Figure 4.

It will be clear that the flanges 18 receive the cover plate 13 and that there is a passage 23 between the flanges and beneath the cover which accommodates the light sensitive member in its travel between the three openings 19, 20 and 21. A slide 24 operates in the passage 23 and comprises a flat rectangular piece of metal having a thumb or finger projection 25 at its outer end and a frame 26 projecting from its inner end, the side or longitudinal walls being of a thinner gauge than that of the plate 24 and end wall 27. The frame 26 is tapered along its side walls to correspond with the inclined sides of the guides 18 against which they seat when the slide 24 is pushed into the passage 23 as far as it is intended to go. The frame 26 carries a ground glass plate 28 and when the slide is inserted in the passage the ground glass 28 is positioned directly over the center opening 20 in the guide plate 17. The body of the slide 24 is sufficiently long to cover over the magazine opening 19 when the ground glass 28 and frame 26 are over the center opening 20. To clear the magazine opening 19, the plate or slide 24 is withdrawn until the end wall 27 of the frame 26 is clear of the opening, and in order to determine this position the sides of the slide 24 are provided with triangular notches 29 in which spring actuated pins 30 engage, the latter being mounted in the inner sides of the guide ways 18 adjacent their outer ends, as illustrated particularly in Figures 4 and 9.

Referring now to the magazine and loading mechanism, reference will be had particularly to Figure 7, in which 31 denotes an upright rectangular frame cast in the cover plate 13 directly above the sides of the magazine opening 19. The upper end of the frame 31 is flanged to be received in a groove 32 of the under side of a cover 33, the latter being provided with depending stop bars 34, which form stops against which the light sensitive member is supported before being projected along the passage 23, as hereinafter described. Intermediate the bars 34 is pivotally mounted an armed lock 35, which is operated by a knob 36 above the cover 33 and which is engaged at its ends in grooves 37a disposed adjacent the inner ends of the walls of the frame 31.

The magazine proper consists of a metal container 37 depending from and mounted on the under side of the guide plate 17 and resting at its lower or bottom end upon the bottom plate 12. The container 37 is provided with upright guides or flanges 38, which project towards each other from opposite sides, and which coincide with the outer end wall of the magazine opening 19. The inner end wall and the sides of the container coincide respectively with the inner end and side walls of the magazine opening 19. Mounted in the compartment 39 of the container 37 beneath the opening 19 is a traveling platform 40 upon which the light sensitive members 22 are stacked. The platform 40 is provided with four depending corner pins 41 which project loosely in the bores of four lugs 42 of an elevator arm 43, the pins 41 being surrounded by helix springs 44a to resiliently support the platform 40. The arm 43 projects to one side and through the space between the upright flanges 38 and is provided with a boss or collar having a threaded bore. The threaded bore of the arm 43 receives and traverses an upright threaded spindle 44 rotatably mounted at its opposite ends in the bottom plate 12 and guide plate 17, respectively. Rotary movement is imparted to the screw spindle 44 by means of a bevel pinion 45 fixed on the spindle and a bevel gear 46 in mesh with the pinion and carried by a stud shaft 47 which is supported in a bearing 48 in the side wall of the casing 10 and which carries outside the latter a balance wheel 49 having a crank handle 50. In operation the platform 40 is raised and lowered by turning the screw spindle 44 through rotary movement of the wheel 49 and crank handle 50 outside of the machine.

As already described the frame of the slide plate 24 is provided with a ground glass finder 28 which, in the inner position of the slide, registers with the center opening 20 in the guide plate. This glass is used so that the object to be photographed may be viewed and properly focused before a light sensitive member is inserted for exposure. In order to facilitate this operation, the cover plate 13 is provided with a second rectangular flange or frame 51, closely adjacent the first frame 31 and clearly illustrated in Figures 6 and 8. The bottom of the frame 51 is provided with an inside flange 52 upon which rests the two part frame 53 which in turn clamps between its parts the inner end of a folding leather or cloth shadow box 54, the latter being collapsed into the frame 51 when not in use. The front wall of the shadow box 54 is attached to the inner face of a trap door 55 which is hinged in the frame 51 and protected against light entering the camera along the hinge connected by means of a flexible cover strap 56.

When the light sensitive member 22 has taken the place of the ground glass and frame 26 beneath the center opening 20, as hereinafter described, the member is positioned by a stop 57 comprising an arm which seats in a recess 58 in the under side of the cover plate 13 and which is carried by the inner end of an upright pin 59. The arm of the stop 57 is normally projecting into the passage 23 to abut the leading end of the member 22 and is yieldably held in this position by a helix spring 60 surrounding the pin 59, the upper end of the spring abutting a shoulder on a boss 61 in which the pin is mounted. The lower end of the spring 60 is anchored in the pin so the tendency is to drive the latter downwardly. The outer end of the pin is outside the cover plate 13 and is provided with a knob 62 to raise the pin and arm to free the light sensitive member 22.

Referring now to Figures 1, 2, 3 and 5, it will be seen that the front wall 11 of the casing 10 is provided with a rectangular opening or slot 63 which extends for a substantial distance below the line of the center opening 20, and on the opposite upright sides of which are arranged a pair of guides or tracks 64. Slidably mounted in these guides 64 is an apertured plate 65 on the back of which is a box 66 with straight back, side and top walls and with an inclined bottom wall 67. The bottom wall 67 is disposed at approximately a 45 degree angle and projects from the lower end of the aperture in the plate 65 to the point where it joins the back wall of the box. A mirror 68 is mounted on this bottom wall 67 for the purpose of reversing any images reflected in its surface. Above the plane of the mirror 68 is a lateral partition 69 which carries the lens barrel 70, as illustrated in Figure 1. The box 66 is provided with a second partition 71 at the upper end of the aperture from which a cylindrical housing 72 for the lens barrel depends. The upper end of the box 66 projects towards the opening 20 to protect the light sensitive member from being light-struck.

The purpose of slidably carrying the lens barrel 70 and mirror 68 is to provide for focusing which is accomplished by means of a rack 73 on the side wall of the box 66 and a pinion 74 in mesh with the rack and operated through a shaft 75 and knob 76 on the outside of the casing 10.

Referring now to the final step in handling the exposed light sensitive members 22, illustrated particularly in Figures 2, 3 and 5, 77 denotes a chute leading from the opening 21 downwardly towards the developing compartment at the bottom of the casing 10. It should be noted that the back or inner end of the opening 21 is not flanged so that when an exposed member 22 is pushed into position over the opening its rear end and sides will not be supported to allow it to drop towards the rear into the chute 77. The chute 77 comprises a metal box having a downwardly and rearwardly directed convex front and bottom wall 78, upright side walls 79 which are adjacent one side of the box 66 on one side and the side of the casing 10 on the other, and which carry a triangular bridge piece 80 at their rear ends, the hypotenuse of the bridge piece so facing the curved wall 78 from which it is spaced a relatively short distance at its lower end. Below the side walls 79 the wall 78 becomes straight and takes an upright position except for a transverse dent 81 at the elevation where the side walls stop and a rearwardly projecting downwardly inclined lip 82 at its extreme lower end. A further guide or stop plate 83a is mounted on the bottom plate 12 and projects perpendicular thereto directly beneath the lower end of the wall 78 and its lip 82, as illustrated particularly in Figure 5.

When the exposed member 22 falls through the opening 21 it lands face down upon the curved wall 78 and is guided downwardly between the latter and the bridge piece 80 until it strikes the lip 82 which throws the lower end of the member 22 rearwardly and into a holder 83. The holder 83 comprises a rectangular frame, the upright sides of which are angle pieces and embrace the sides and rear of the chute 77. The bottom portion of the holder frame has all four sides enclosed and across the bottom between the front and back walls on strips 84 are two spaced bridge pieces 85 having upstanding lugs or teeth 86 which come under the lip 82 and help support the member 22 at its lower end. These lugs 86 also divide the holder into two parts in order to accommodate two exposed members arranged face to face.

The holder 83 is an integral part of the swinging developing frame which is adapted to not only move axially from top to bottom of the casing 10 but to swing about in a semi-circle as well. The upper arm of the holder frame 83 engages over an upwardly inclined surface of a shoe 87 when the holder is being swung into receiving position against the chute 77 so as to bring the holder to the proper height to receive the member 22 as it falls through the chute, and to prevent the holder from swinging outwardly unaided, a small spring latch or dog 88 is used to engage over the upper arm of the frame, the dog being carried on the under side of the cover plate 13.

The upper arm of the holder 83 projects towards the center of the semi-circular casing 10 and is mounted at its inner end in an upright spindle or shaft 89 and to guide the arm in its upright movement with the spindle it is engaged between two radially supported spaced upright bars 90. The arm also projects through a slot 91 in a tubular bearing post 92. The post 92 carries at its upper and lower ends the radial arms 93 in which the ends of the bars 90 are mounted. The lower end of the post 92 is rotatably supported upon an upstanding bracket 94 having a bore to receive and guide the spindle 89 in its axial movements. The upper end of the post 92 projects through and bears in a bearing in the cover plate 13 and carries a pointer 95. The pointer moves over an arcuately shaped dial plate 96 which has indications for eight different radial positions of the pointer and one indication to show when the holder is in raised and receiving position against the chute 77. In the raised position of the holder 83 the spindle 89 projects considerably above the top of the casing, as shown in dotted lines in Figure 10 and at its upper end is provided with a knob 97. The spindle is held in its uppermost position by means of a recess 98 in its surface about midway of its length and a spring pressed ball 99 mounted in a radial bore 100 in the post 92 and hub of the pointer 95, as indicated in Figures 10 and 11.

Corresponding to each of the eight lowered positions of the holder 83, as indicated by the dial 96, there are segmentally shaped tanks 101 standing upon the bottom plate 12 and being arranged side by side from a point adjacent the upstanding plate 83a at one end to a point adjacent the back wall of the magazine container 37. The tanks are separate containers and are joined together at their adjacent upper ends by inverted U-shaped pieces 102 so as to prevent the developers from getting in between the adjacent sides. There are eight of these tanks 101 and when assembled they fit just inside the lower portion of the casing below the door 14 so that by simply opening the latter the tanks may be removed or refilled without disturbing any other part of the machine.

Referring now to the light sensitive members 22, as illustrated in Figures 14 and 15, each comprises a paste board rectangular backing 103 and a sheet 104 having one face thereof provided with a light sensitive emulsion 105. The backing 103 and carrier 104 for the emulsion are supported in a metal frame 115 consisting of channel material clamped over the edges of the backing and carrier and provided with a raised marginal portion 106 on its front or face having the light sensitive surface. The purpose of the raised portion 106 is to keep the sensitive surface free from contact with the back of the underlying member when a series thereof are stacked in the container or magazine.

The container in which the light sensitive members are stored before being placed in the magazine comprises a long box 107 permanently closed at one end by a bottom 108 and provided at the other end with a cover not shown. On opposite sides of the open end of the box there are two slots 109 through which a cord 110 is threaded and stretched between the walls. One end of the cord may be fastened to the box side and the other allowed to be free. Resting against the cord is a heavy board 111 and upon the board the stacked members 22. To load the magazine the cover 33 thereof is removed and the platform and elevator 40 raised. The container 107 with its cover removed is inverted over the frame 31 and allowed to seat against the flanges. The cord 110 is then released and withdrawn and the board 111 and members 22 may be lowered into the magazine as the platform is lowered. Having completed the loading operation the box is removed and the cover 33 replaced.

In operation, the steps are very simple; first the operator focuses the lens properly and the slide 24 is withdrawn to the point where a light sensitive member 22 is resiliently raised into the passage 23 and pushed along the latter by the end of the frame 26 until the outer end engages the stop 57. The member 22 may then be exposed and the stop 57 raised out of the passage 23 to allow the member 22 to be moved to the final stage of the passage where it will drop into the chute 77 and descend to take its place in upright position on the holder 83, the latter having been raised to its receiving position over the end of the chute.

The member 22 is then ready to be developed and the knob 97 may be turned towards the left until the pointer 95 registers with the first numbered line on the dial 96 and the holder has been released from the dog 88. The spindle 89 and holder 83 are allowed to drop, the latter with its member 22 entering the first tank 101 where it is developed. The knob, spindle and holder are again lifted after the developing period is over and they are turned to a position over the second tank which contains water. This operation is repeated throughout the eight tanks until the picture has been completed and is ready to be removed from the holder. This is done by opening the door 14 and raising the holder out of the last or eighth tank and swinging it to a convenient position to allow removal of the member 22.

Having described my invention and the manner in which the same operates, what I claim and desire by Letters Patent is:

1. In a portable camera and developing device, a magazine and a conveyor support therefor for resiliently carrying a plurality of superimposed light sensitive members, a slide for moving said members singly from the magazine to two separate stations, means to expose the member at the first station, a developing tank and means to receive the member at the second station and carry it to said developing tank.

2. In a portable camera and developing device, a magazine and upright conveyor support therefor for resiliently carrying a plurality of superimposed light sensitive members, a slide for moving said members singly from the magazine to two separate stations and having a finder arranged therein to register with the first station, means to expose the member at the first station after the finder is withdrawn, a plurality of containers for baths for treating the exposed member, and means to receive the exposed member at the second station and to carry it into and out of said baths to produce a finished photograph.

3. In a portable camera and developing device, a magazine and upright conveyor support therefor for resiliently carrying a plurality of superimposed light sensitive members, means defining a horizontal passage open to said magazine and conveyor, a slide movable in said horizontal passage for moving said members singly from the magazine to two separate stations, said slide having a ground glass window at its leading end to register with the first station, a vertically adjustable lens and reversing surface at the first station to expose the member after the window is withdrawn, means to receive and hold the exposed member at the second station and to carry it through a plurality of raised and lowered positions at different angles, and a plurality of tanks to contain separately the developing, washing and bleaching liquids, each tank being disposed to receive the means holding the exposed member in one of its lowered positions.

4. A portable camera, as claimed in claim 1, in which the magazine, means to expose the members and means to receive and carry the members through the developing tank are enclosed in a casing having separate openings to the magazine, exposing means and carrying means.

5. A portable camera, as claimed in claim 1, in which the magazine comprises a separate upright container, and the conveyor support comprises a resiliently supported platform for the members, a rotary screw for raising and lowering the platform, and means controlled from outside the camera to operate the screw.

6. A portable camera, as claimed in claim 1, in which the magazine comprising a separate upright container, and a cover for the magazine to limit the upward movement of the platform to bring the uppermost member above the plane of the slide.

7. A portable camera, as claimed in claim 2, in which the means to expose the member comprises a lens and means providing a reversing surface and a housing to contain said lens and surface, and means controlled from the outside of the camera to raise and lower the housing to change the focus in the finder and on the member at the first station.

8. A portable camera, as claimed in claim 2, in which the means to expose the member comprises a lens and means providing a reversing surface and a housing to contain said lens and surface and to open into the passage traversed by the slide and member, means controlled from the outside of the machine to raise and lower the housing to change the focus in the finder and on the member at the first station, and a collapsible shadow box on the outside of the camera at said first station to obtain a view of the object being projected by the lens onto the finder.

9. A portable camera, as claimed in claim 1, including means controlled from the outside of the camera to releasably hold the member in registered position at the first station.

10. A portable camera, as claimed in claim 1, including means to guide the exposed member from a horizontal position at the second station to take an upright position in the receiving means.

11. A portable camera, as claimed in claim 2, including means to guide the exposed members from a horizontal position at the second station to take an upright position in the means for carrying the member through the baths.

12. A portable camera, comprising a magazine, means forming a horizontal passage above and in communication with said magazine, a station in said passage in which a light sensitive plate is exposed, a second station in which the plate is received and conveyed through a plurality of plate-treating baths, a slide in said passage for moving the plates singly from the magazine to the two stations, and a housing for the several elements having separate openings to the magazine, first and second stations.

13. A portable camera, as claimed in claim 12, including closures for each opening and means to carry the plate at the second station through its baths.

14. A portable camera, as claimed in claim 12, including a plurality of radially disposed containers for the baths, a guide at the second station to receive the plate in horizontal position and to guide it downwardly to an upright position, means for receiving and holding the plate in upright position and carrying it radially from one position to the next and lowering it into a bath at each position.

15. A portable camera, as claimed in claim 12, including a plurality of radially disposed containers for the baths, a guide at the second station to receive the plate in horizontal position and to guide it downwardly to an upright position, means for receiving and holding the plate in upright position and carrying it radially from one position to the next and lowering it into a bath at each position, and segmentally arranged tanks at each position to contain the baths.

16. A portable camera, as claimed in claim 12, including a plurality of radially disposed containers for the baths, a guide at the second station to receive the plate in horizontal position and to guide it downwardly to an upright position, means for receiving and holding the plate in upright position and carrying it radially from one position to the next and lowering it into a bath at each position, and segmentally arranged tanks at each position to contain the baths and means to bring adjacent sides of the tanks together and to close over the space therebetween to prevent the drip from the passing plate to enter between the outside walls of the tanks.

17. A camera comprising a casing having means for exposing a light-sensitive member to take a picture, and an opening through which said member is discharged after exposure, a container within said casing for a liquid for treating the exposed member, and a carrier mounted in said casing in position to receive the exposed member when it is discharged through said opening and movable laterally of said opening and also movable vertically in a rectilinear path in relation to said container whereby to carry said exposed member into and out of said container.

18. A camera comprising a casing having means for exposing a light-sensitive member to take a picture, and an opening through which said member is discharged after exposure, a container within said casing for a liquid for treating the exposed member, and a carrier mounted in said casing in position to receive the exposed member when it is discharged through said opening and movable laterally of said opening and also movable vertically in a rectilinear path in relation to said container whereby to carry said exposed member into and out of said container, and means on the outside of said casing for moving said carrier.

19. A camera comprising a casing having means for exposing a light-sensitive member to take a picture, and an opening through which said member is discharged after exposure, a magazine for light-sensitive members mounted within said casing below said opening, means for transferring a light-sensitive member from the magazine for exposure and after exposure to said opening, a container within said casing for a liquid for treating the exposed member, and a carrier mounted in said casing below said opening in position to receive the exposed member when it is discharged through said opening and movable laterally of said opening and vertically with relation to said container to carry the exposed member into and out of said container.

20. A camera comprising a casing having means for exposing a light-sensitive member to take a picture, and an opening through which said member is discharged after exposure, a magazine for light-sensitive members mounted within said casing below said opening, means for transferring a light-sensitive member from the magazine for exposure and after exposure to said opening, a container within said casing below said opening for a liquid for treating the exposed member, and a carrier mounted in said casing below said opening in position to receive the exposed member when it is discharged through said opening and movable laterally of said opening and vertically with relation to said container to carry the exposed member into and out of said container, and means on the container for moving said carrier.

21. A camera comprising a casing having means for exposing a light-sensitive member to take a picture, and an opening through which said member is discharged after exposure, a magazine for light-sensitive members mounted within said casing, a horizontal guideway disposed above said opening and magazine in communication therewith, means for transferring a light-sensitive member from the magazine through said guideway for exposure and after exposure to said opening, a container within said casing for a liquid for treating the exposed member, and a carrier rotatably movable and also longitudinally movable in a rectilinear path in said casing in position to receive the exposed member when it is discharged through said opening and carry it into and out of said container.

22. A camera comprising a casing having means for exposing a light-sensitive member to take a picture, and an opening through which said member is discharged after exposure, a magazine for light-sensitive members mounted within said casing, a horizontal guideway disposed above said opening and magazine in communication therewith, means for transferring a light-sensitive member from the magazine through said guideway for exposure and after exposure to said opening, a container within said casing for a liquid for treating the exposed member, and a carrier rotatably movable and also longitudinally movable in a rectilinear path in said casing in position to receive the exposed member when it is discharged through said opening and carry it into and out of said container, and means on the container for moving said carrier.

23. A camera comprising a casing having means for exposing a light-sensitive member to take a picture, and an opening through which said member is discharged after exposure, a plurality of containers within said casing for liquids for treating the exposed member, said casing having an arcuate wall and said containers disposed radially with respect thereto, and a carrier rotatably movable and also vertically movable in a rectilinear path in said casing in position to receive the exposed member when it is discharged through said opening and carry it into and out of each of said containers successively.

24. A camera comprising a casing having means for exposing a light-sensitive member to take a picture, and an opening through which said member is discharged after exposure, a plurality of containers within said casing for liquids for treating the exposed member, said casing having an arcuate wall and said containers disposed radially with respect thereto, and a carrier rotatably movable and vertically movable in a rectilinear path in said casing in position to receive the exposed member when it is discharged through said opening and carry it into and out of each of said containers successively, and means on the outside of said casing for moving said carrier.

25. A camera comprising a casing having means for exposing a light-sensitive member to take a picture, and an opening through which said member is discharged after exposure, a magazine for light-sensitive members mounted within said casing, means for transferring a light-sensitive member from the magazine for exposure and after exposure to said opening a plurality of containers within said casing for liquids for treating the exposed member, said casing having an arcuate wall and said containers disposed radially with respect thereto, and a carrier rotatably movable and also vertically movable in a rectilinear path in said casing in position to receive the exposed member when it is discharged through said opening and carry it into and out of each of said containers successively.

26. A camera comprising a casing having means for exposing a light-sensitive member to take a picture, and an opening through which said member is discharged after exposure, a magazine for light-sensitive members mounted within said casing, means for transferring a light-sensitive member from the magazine for exposure and after exposure to said opening, a plurality of containers within said casing for liquids for treating the exposed member, said casing having an arcuate wall and said containers disposed radially with respect thereto, and a carrier rotatably movable and also vertically movable in a rectilinear path in said casing in position to receive the exposed member when it is discharged through said opening and carry it into and out of each of said containers successively, and means on the outside of said casing for moving said carrier.

27. A portable camera, comprising a magazine, means forming a horizontal passage above and in communication with said magazine, a station in said passage in which a light sensitive plate is exposed, a second station in which the plate is received and conveyed through a plurality of plate-treating baths, a slide in said passage for moving the plates singly from the magazine to the two stations, a housing for the several elements having openings to the magazine, first and second stations, and means for conveying a light-sensitive plate from said magazine to said horizontal passage.

28. A portable camera, comprising a magazine, means forming a horizontal passage above and in communication with said magazine, a station in said passage in which a light-sensitive plate is exposed, a second station in which the plate is received and conveyed through a plurality of plate-treating baths, a slide in said passage for moving the plates singly from the magazine to the two stations, a housing for the several elements having openings to the magazine, first and second stations, a platform in said magazine movable longitudinally thereof, and means for moving said platform.

29. A camera comprising a casing having means for exposing a light-sensitive member to take a picture, and an opening through which said member is discharged after exposure, a container within said casing for a liquid for treating the exposed member, and a carrier mounted in said casing in position to receive the exposed member when it is discharged through said opening and movable laterally of said opening and also movable vertically in a rectilinear path in relation to said container whereby to carry said exposed member into and out of said container, said carrier comprising an open frame, and a rotatable and slidable vertical shaft on which said frame is mounted.

30. In a camera, a magazine for a plurality of superposed light-sensitive members, means to convey said members to a station at which they are exposed, means to expose said members at said station comprising a movable support carrying a lens and provided with a reversing surface, and means to move said support to vary the focus on the member at said station.

31. A camera comprising a casing having means for exposing a light-sensitive member to take a picture, and an opening through which said member is discharged after exposure, a plurality of containers within said casing for liquids for treating the exposed member, and a carrier to receive the exposed member when it is discharged through said opening and carry it into and out of said containers, said carrier being mounted for rotatable and slidable movement and said containers being disposed radially of the axis of rotation of said carrier.

32. A camera comprising a casing having means for exposing a light-sensitive member to take a picture, and an opening through which said member is discharged after exposure, a plurality of containers within said casing for liquids for treating the exposed member, a carrier to receive the exposed member when it is discharged through said opening and carry it into and out of said containers, said carrier being mounted for rotatable and slidable movement, said containers being disposed radially of the axis of rotation of said carrier, and means on the outside of said casing for moving said carrier.

TORRANCE R. LAING.